C. B. SCHOENMEHL & W. STRAW.
BATTERY ELECTRODE SUPPORT.
APPLICATION FILED AUG. 4, 1909.
948,379.
Patented Feb. 8, 1910.
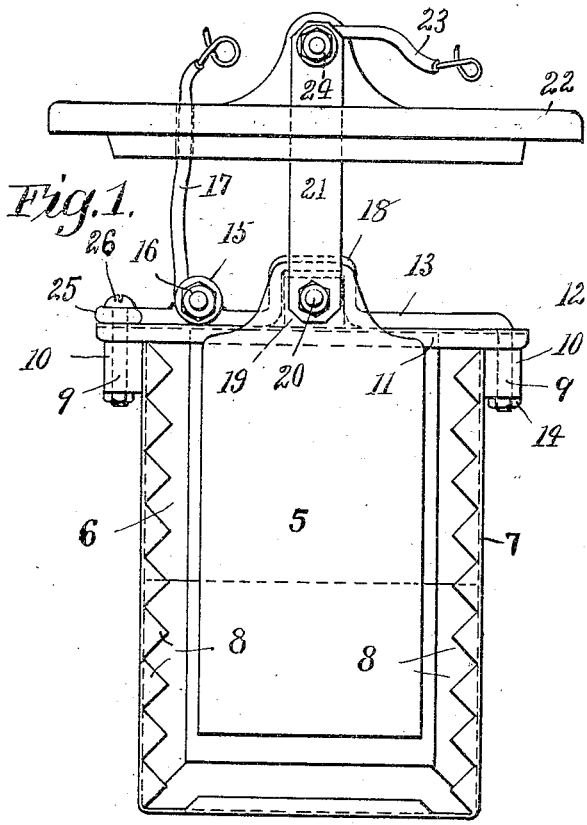
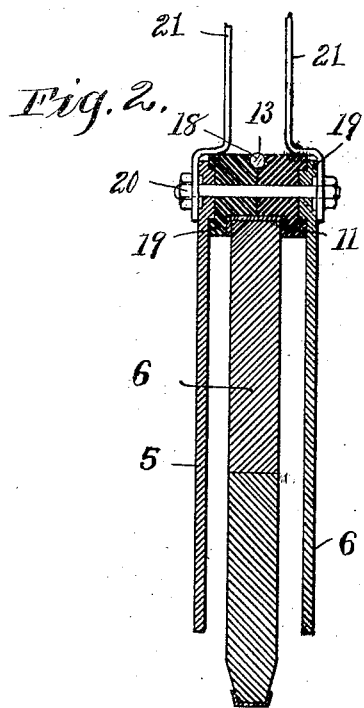
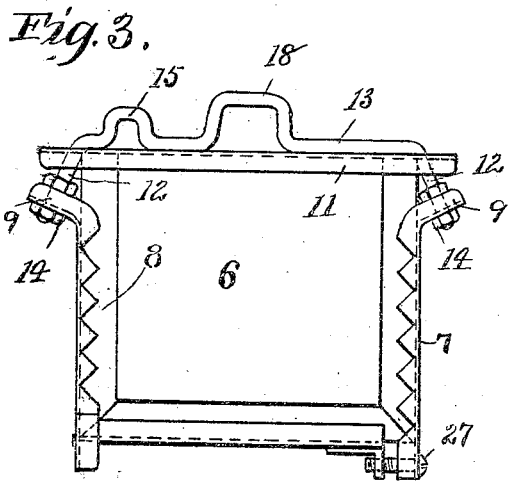
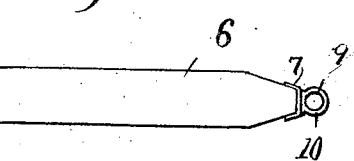
Witnesses
Inventors.
Charles B. Schoenmehl
and Wilfred Straw
By Chamberlain & Newman
Attorneys

UNITED STATES PATENT OFFICE.

CHARLES B. SCHOENMEHL AND WILFRED STRAW, OF WATERBURY, CONNECTICUT; SAID STRAW ASSIGNOR TO SAID SCHOENMEHL.

BATTERY ELECTRODE-SUPPORT.

948,379.

Specification of Letters Patent. Patented Feb. 8, 1910.

Application filed August 4, 1909. Serial No. 511,097.

*To all whom it may concern:*

Be it known that we, CHARLES B. SCHOENMEHL and WILFRED STRAW, citizens of the United States, and residents of Waterbury, in the county of New Haven and State of Connecticut, have invented certain new and useful Improvements in Battery Electrode-Supports, of which the following is a specification.

Our invention appertains to primary batteries and particularly to that class employing zinc and copper plates as their positive and negative electrodes when used in connection with a suitable solution.

The purpose of the invention is to provide a special and improved form of holding frame for supporting the said plate electrodes in their proper position one with relation to the other within a battery jar; to design the frame in a simple, practical and inexpensive manner whereby the said elements and especially the negative electrode plate will be firmly engaged around its edge portions leaving its two sides free for attack by the solution.

As designed the frame is adapted to be supported from any one of several styles of covers and is further constructed to accommodate either a single, or a series of negative plates as desired according to the capacity of the battery to be produced.

Upon the accompanying sheet of drawings forming a part of this specification, similar characters of reference will be found to designate like or corresponding parts throughout the several figures and of which, Figure 1, shows a side elevation of our improved electrode supporting frame suspended from a battery cover and containing both a positive and negative electrode. Fig. 2, is a longitudinal, central, vertical sectional view through the electrodes and frame shown in Fig. 1. Fig. 3, shows a somewhat smaller and modified form of supporting frame designed to support a single negative electrode, and Fig. 4, shows a detached top edge plan view of the lower portion of the frame with negative electrode supported therein.

Our improved supporting frame is formed of sheet metal and wire together with suitable insulating blocks used intermediate of the positive and negative electrodes 5 and 6, and in detail comprises a hanger 7 that is formed of sheet metal having its longitudinal edge portions bent over to engage the sides of the edge portions of the negative plate 6 and serrated as at 8 to insure a better attack of the solution upon the plates. This hanger is of substantially a U shape and has its side portions disposed upward at a right angle to the intermediate bottom portion, which latter engages the bottom edge of the plate 6 while the sides engage the side edges of the plate. An eye 9 is formed in the upper end of the side portions of said hanger and may be produced by deflecting the upper end of the stock of the sides out as shown in Fig. 2, or by securing a separate piece of metal 10 thereto as shown in Figs. 1 and 4. A sheet metal channel strip 11 is arranged across the top edge of the plate and is provided at each end with a hole that registers with the eye 9 and the two serve to permit the ends 12 of the wire yoke 13 to be inserted therethrough for the reception of nuts 14 and whereby the hanger is securely drawn up against the several side edges of the negative plate or plates.

The yoke 13 is disposed crosswise of the top of the channel plate and is provided with an eye 15 for the attachment of the binding nut 16 for the connection of the field wire 17 and is further provided with a loop portion 18 to receive the inner reduced abutting faces of the insulating blocks 19 which rest upon the top and sides of the channel strip 13 and are secured together by means of a bolt 20. The outer faces of these insulating blocks are recessed to receive the shouldered portion of the positive plates 5 attached thereto by means of the bolt 20 before mentioned. The hangers 21 by means of which the frame and electrode are suspended from the cover 22 are also connected through the medium of the said bolt 20 as shown in Fig. 2. By this form of construction it will be noted that the positive plates and connected hangers 21 are insulated from the negative plates though all are connected together, and can be attached or removed as if but a single piece. A field wire 23 is attached to a bolt 24 uniting the two hangers 21 and is thus obviously connected to the opposite side of the battery from what the wire 17 is attached.

In Fig. 1, we have shown in part an eye 25 formed in the outer end of the yoke 13 and a separate screw 26 arranged therein and through the eye 9 for the connection of the yoke, channel strip and hanger, instead of deflecting both ends of the yoke down, as shown in Fig. 3.

While the hanger 7 is preferably formed in one piece as shown in Fig. 1, it may be formed in several parts as shown in Fig. 3, and the sides thereof made adjustable with respect to each other through the medium of a screw 27 and whereby said parts can be drawn close together to insure a perfect contact of the hanger with the plate.

It will be seen from the foregoing that the parts would obviously be assembled by first arranging the positive plate or plates within the hanger whereupon the channel strip and yoke would be connected up and secured thereto by the nuts 14, thus drawing the several parts of the frame snugly against the edge of the negative plates in a way to rigidly support the same, yet leave the sides exposed for action, after this the insulating blocks, the positive plates and the hangers 21, would be assembled in their respective orders and secured in place through the medium of the bolt 20 before mentioned.

Having thus described our invention what we claim and desire to secure by Letters Patent is:—

1. An electrode support for batteries, comprising in part, a top cross yoke, a sheet metal hanger including sides to engage the edges of the electrode and having a serrated edge to engage the opposite faces of the negative plate, and means for securing the hanger and yoke together.

2. An electrode support for batteries, comprising a frame including in part a top cross yoke having its ends disposed downward, a sheet metal hanger to engage an electrode and attached to the ends of the said yoke and having its edges serrated and bent over upon the face of the electrode.

3. An electrode support for batteries, comprising in part a top cross yoke, a hanger including a bottom and side portions adjustably connected together said side portions having eyes in their upper ends, and means for securing the yoke and eyes together.

4. In an electrode support for batteries, the combination of a sheet metal hanger adapted to engage the edges of an electrode and having serrated edge portions to overlap the opposite faces of the electrode, means for securing the said hanger against the edges of said electrode and means for supporting the whole from the cover of a jar.

5. An electrode support for batteries, comprising in part, a top cross yoke, a sheet metal hanger having a serrated edge to engage the edge portion of a negative electrode, and means for securing the hanger and yoke together.

Signed at Waterbury, in the county of New Haven, and State of Connecticut, this 30th day of July, A. D. 1909.

CHARLES B. SCHOENMEHL.
WILFRED STRAW.

Witnesses:
PHILIP E. HENDRICK.
ROBERT A. LOWE.